(12) United States Patent
Sugino

(10) Patent No.: US 12,111,009 B2
(45) Date of Patent: *Oct. 8, 2024

(54) FLAME-RETARDANT THERMAL INSULATION SHEET AND FLAME-RETARDANT THERMAL INSULATION MATERIAL

(71) Applicant: NITTO DENKO CORPORATION, Osaka (JP)

(72) Inventor: Yusuke Sugino, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 323 days.

This patent is subject to a terminal disclaimer.

(21) Appl. No.: 17/770,799

(22) PCT Filed: Nov. 6, 2020

(86) PCT No.: PCT/JP2020/041478
§ 371 (c)(1),
(2) Date: Apr. 21, 2022

(87) PCT Pub. No.: WO2021/124718
PCT Pub. Date: Jun. 24, 2021

(65) Prior Publication Data
US 2022/0390058 A1    Dec. 8, 2022

(30) Foreign Application Priority Data
Dec. 19, 2019   (JP) .................................. 2019-228722

(51) Int. Cl.
*C08J 9/06*    (2006.01)
*C08J 9/00*    (2006.01)
(Continued)

(52) U.S. Cl.
CPC ............ *F16L 59/029* (2013.01); *C08J 9/0009* (2013.01); *C08J 9/06* (2013.01); *C08K 3/40* (2013.01);
(Continued)

(58) Field of Classification Search
CPC ..................... C08J 2321/00; C08J 2333/04; C08J 2363/00; C08J 2383/04; C08J 9/0009;
(Continued)

(56) References Cited

U.S. PATENT DOCUMENTS 6,616,866 B1   9/2003   Crompton
7,652,090 B2   1/2010   Alexander et al.
(Continued)

FOREIGN PATENT DOCUMENTS

CN   102356124 A   2/2012
CN   105307857 A   2/2016
(Continued)

OTHER PUBLICATIONS

ISR issued in Int'l Patent Application No. PCT/JP2020/041478, Dec. 28, 2020, translation.
(Continued)

*Primary Examiner* — Lawrence D Ferguson
(74) *Attorney, Agent, or Firm* — GREENBLUM & BERNSTEIN, P.L.C.

(57) ABSTRACT

Provided is a flame retardant and heat insulating sheet having high flame retardancy and a high heat insulating property. Also provided is a flame retardant heat insulator including such flame retardant and heat insulating sheet. A flame retardant and heat insulating sheet according to one embodiment includes: a flame retardant and heat insulating layer formed from a resin composition (A); and a heat insulating layer, wherein the resin composition (A) contains: a binder resin; a low-melting point inorganic substance; a
(Continued)

high-melting point inorganic substance; and voids. A flame retardant and heat insulating sheet according to one embodiment includes: a flame retardant and heat insulating layer formed from a resin composition (B); and a heat insulating layer, wherein the resin composition (B) contains: a binder resin that produces a high-melting point inorganic substance when heated; a low-melting point inorganic substance; and voids and/or a void-forming agent.

23 Claims, 1 Drawing Sheet

(51) Int. Cl.
  C08K 3/40 (2006.01)
  C08K 7/28 (2006.01)
  C09K 5/06 (2006.01)
  F16L 59/02 (2006.01)
(52) U.S. Cl.
  CPC ............... *C08K 7/28* (2013.01); *C09K 5/063* (2013.01); *C08J 2321/00* (2013.01); *C08J 2333/04* (2013.01); *C08J 2363/00* (2013.01); *C08J 2383/04* (2013.01)
(58) Field of Classification Search
  CPC ...... C08J 9/06; C08J 2203/22; C08J 2207/02; C08J 9/0066; C08J 9/32; C08K 3/40; C08K 7/28; C09K 5/063; F16L 59/029; F16L 59/065; B32B 27/18; B32B 27/20; B32B 7/027; C08L 83/04
  See application file for complete search history.

(56) References Cited

U.S. PATENT DOCUMENTS

| 9,598,555 | B2 | 3/2017 | Hirano |
| 2006/0068201 | A1 | 3/2006 | Alexander et al. |
| 2006/0155039 | A1 | 7/2006 | Alexander et al. |
| 2012/0003457 | A1 | 1/2012 | Hatanaka et al. |
| 2015/0376366 | A1 | 12/2015 | Hirano |

FOREIGN PATENT DOCUMENTS

| EP | 2 993 038 A1 | 3/2016 |
| EP | 2 993 039 A1 | 3/2016 |
| EP | 2 993 039 A4 | 12/2016 |
| EP | 2 993 039 B1 | 7/2018 |
| JP | S55-066952 A | 5/1980 |
| JP | S63-126740 A | 5/1988 |
| JP | H07-186333 A | 7/1995 |
| JP | 2000-229387 A | 8/2000 |
| JP | 2002-544321 A | 12/2002 |
| JP | 2004-175897 A | 6/2004 |
| JP | 2006-504859 A | 2/2006 |
| JP | 4491778 B2 | 6/2010 |
| JP | 4539349 B2 | 9/2010 |
| JP | 2012-012913 A | 1/2012 |
| JP | 2012-211298 A | 11/2012 |
| JP | 2014-231597 A | 12/2014 |
| JP | 2016-027069 A | 2/2016 |
| WO | 2013/053566 A1 | 4/2013 |

OTHER PUBLICATIONS

Office Action issued in CN Patent Application No. 202080087987.9, Feb. 6, 2024, translation.

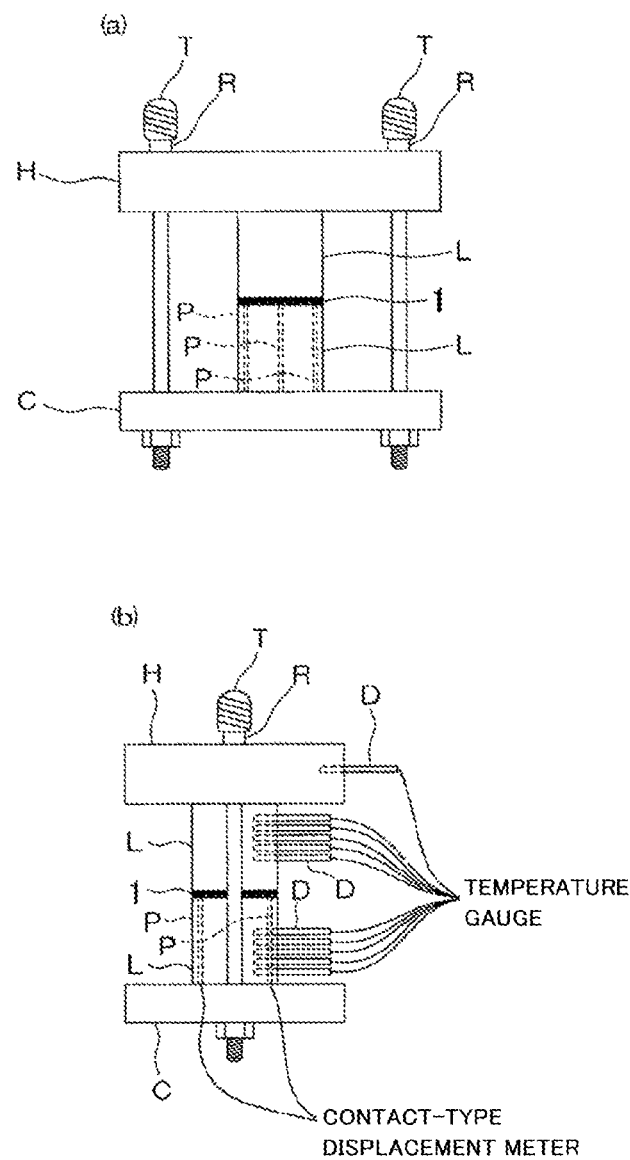

FLAME-RETARDANT THERMAL INSULATION SHEET AND FLAME-RETARDANT THERMAL INSULATION MATERIAL

TECHNICAL FIELD

The present invention relates to a flame retardant and heat insulating sheet and a flame retardant heat insulator.

BACKGROUND ART

One kind of safety that a building, a vehicle, or the like is required to have is, for example, flame retardancy. A flame retardant and heat insulating material has been proposed as a material for imparting such flame retardancy (e.g., Patent Literatures 1 to 4).

As a method of causing the flame retardant and heat insulating material to express the flame retardancy, there has been performed, for example, the mixing of a flame retardant in accordance with a use situation (e.g., a halogen-based flame retardant or an inorganic flame retardant), which is appropriately selected, into the flame retardant and heat insulating material, the use of a flame retardant resin in accordance with a use situation as a main component for the flame retardant and heat insulating material, or coating with a flame retardant paint (e.g., an inorganic paint).

In recent years, in the field of, for example, electrical and electronic devices each of which is provided with a heat-generating member, there has been a demand for the development of a flame retardant and heat insulating material having high flame retardancy and further having a heat insulating property imparted thereto.

In particular, a flame retardant and heat insulating material of a sheet shape is easy to arrange in a small space or an uneven site, and hence is preferred.

CITATION LIST

Patent Literature

[PTL 1] JP 07-186333 A
[PTL 2] JP 4491778 B2
[PTL 3] JP 4539349 B2
[PTL 4] JP 2014-231597 A

SUMMARY OF INVENTION

Technical Problem

An object of the present invention is to provide a flame retardant and heat insulating sheet having high flame retardancy and a high heat insulating property. Another object of the present invention is to provide a flame retardant heat insulator including such flame retardant and heat insulating sheet having high flame retardancy and a high heat insulating property.

Solution to Problem

According to one embodiment of the present invention, there is provided a flame retardant and heat insulating sheet, including: a flame retardant and heat insulating layer formed from a resin composition (A); and a heat insulating layer, wherein the resin composition (A) contains: a binder resin; a low-melting point inorganic substance; a high-melting point inorganic substance; and voids.

In one embodiment, the high-melting point inorganic substance has the voids.

In one embodiment, the high-melting point inorganic substance is at least one kind selected from a glass balloon, a silica balloon, a Shirasu balloon, and a ceramic balloon.

In one embodiment, the binder resin is at least one kind selected from a thermoplastic resin, a thermosetting resin, and a rubber.

In one embodiment, a content of the low-melting point inorganic substance with respect to 100 parts by weight of the binder resin is from 50 parts by weight to 500 parts by weight in terms of solid content.

In one embodiment, a content of the high-melting point inorganic substance with respect to 100 parts by weight of the binder resin is from 10 parts by weight to 400 parts by weight in terms of solid content.

In one embodiment, a total content of the binder resin, the low-melting point inorganic substance, and the high-melting point inorganic substance in the resin composition (A) is from 80 wt % to 100 wt % in terms of solid content.

In one embodiment, the heat insulating layer is at least one kind selected from a fibrous heat insulator, a plastic-based heat insulator, and a nanoporous body.

According to one embodiment of the present invention, there is provided a flame retardant and heat insulating sheet, including: a flame retardant and heat insulating layer formed from a resin composition (B); and a heat insulating layer, wherein the resin composition (B) contains: a binder resin that produces a high-melting point inorganic substance when heated; a low-melting point inorganic substance; and voids and/or a void-forming agent.

In one embodiment, the void-forming agent is a foaming agent that forms voids through chemical foaming.

In one embodiment, the voids are voids formed by at least one kind selected from chemical foaming, mechanical foaming, solvent removal foaming, and supercritical fluid foaming.

In one embodiment, wherein the binder resin that produces a high-melting point inorganic substance when heated is a silicone resin.

In one embodiment, a content of the low-melting point inorganic substance with respect to 100 parts by weight of the binder resin that produces a high-melting point inorganic substance when heated is from 50 parts by weight to 500 parts by weight in terms of solid content.

In one embodiment, a total content of the binder resin that produces a high-melting point inorganic substance when heated, the low-melting point inorganic substance, and the void-forming agent in the resin composition (B) is from 80 wt % to 100 wt % in terms of solid content.

In one embodiment, the heat insulating layer is at least one kind selected from a fibrous heat insulator, a plastic-based heat insulator, and a nanoporous body.

In one embodiment, the flame retardant and heat insulating sheet has a thickness of from 20 μm to 3,000 μm.

In one embodiment, the low-melting point inorganic substance is a glass frit.

In one embodiment, the glass frit is at least one kind selected from a phosphate-based glass frit, a borosilicate-based glass frit, and a bismuth-based glass frit.

According to one embodiment of the present invention, there is provided a flame retardant heat insulator, including: the above-mentioned flame retardant and heat insulating sheet; and a base material.

Advantageous Effects of Invention

According to the present invention, the flame retardant and heat insulating sheet having high flame retardancy and a high heat insulating property can be provided. In addition, the flame retardant heat insulator including such flame retardant and heat insulating sheet having high flame retardancy and a high heat insulating property can be provided.

BRIEF DESCRIPTION OF DRAWINGS

FIG. 1 includes explanatory views of an apparatus for measuring a thermal conductivity, in which (a) is a front view and (b) is a side view.

DESCRIPTION OF EMBODIMENTS

<<<<1. Flame Retardant and Heat Insulating Sheet>>>>

A flame retardant and heat insulating sheet of the present invention includes a flame retardant and heat insulating layer and a heat insulating layer. The number of the flame retardant and heat insulating layers may be only one, or two or more. The number of the heat insulating layers may be only one, or two or more.

The flame retardant and heat insulating sheet of the present invention may be formed of two layers, may be formed of three layers, or may be formed of four or more layers. When the flame retardant and heat insulating sheet of the present invention is formed of three layers, its outermost layer is preferably at least one kind selected from the flame retardant and heat insulating layer and the heat insulating layer. When the flame retardant and heat insulating sheet of the present invention is formed of four or more layers, at least one kind selected from the following is preferred: a configuration in which both of its outermost layers are the flame retardant and heat insulating layers; a configuration in which both the outermost layers are the heat insulating layers; and a configuration in which one of the outermost layers is the flame retardant and heat insulating layer and the other is the heat insulating layer.

The flame retardant and heat insulating sheet of the present invention may include any appropriate other layer to the extent that the effects of the present invention are not impaired as long as the flame retardant and heat insulating sheet includes the flame retardant and heat insulating layer and the heat insulating layer. An example of such other layer is a pressure-sensitive adhesive layer (an adhesive layer in some cases) that may be used for bonding layers to each other.

In a flame retardant and heat insulating sheet according to one embodiment of the present invention, the flame retardant and heat insulating layer is formed from a resin composition (A). The resin composition (A) contains a binder resin, a low-melting point inorganic substance, a high-melting point inorganic substance, and voids. In this description, the flame retardant and heat insulating sheet according to this embodiment of the present invention is sometimes referred to as "flame retardant and heat insulating sheet (A)."

In a flame retardant and heat insulating sheet according to another embodiment of the present invention, the flame retardant and heat insulating layer is formed from a resin composition (B). The resin composition (B) contains a binder resin that produces a high-melting point inorganic substance when heated, a low-melting point inorganic substance, and voids and/or a void-forming agent. In this description, the flame retardant and heat insulating sheet according to this embodiment of the present invention is sometimes referred to as "flame retardant and heat insulating sheet (B)."

The simple term "flame retardant and heat insulating sheet of the present invention" as used herein means that both of the flame retardant and heat insulating sheet (A) and the flame retardant and heat insulating sheet (B) are included. The term "flame retardant and heat insulating sheet" includes the concept of a flame retardant and heat insulating tape.

The flame retardant and heat insulating sheet (A) can express high flame retardancy and a high heat insulating property by virtue of the flame retardant and heat insulating layer being formed from the resin composition (A). The flame retardant and heat insulating sheet (A) can express a higher heat insulating property by virtue of further including the heat insulating layer.

The flame retardant and heat insulating sheet (B) can express high flame retardancy and a high heat insulating property by virtue of the flame retardant and heat insulating layer being formed from the resin composition (B). The flame retardant and heat insulating sheet (B) can express a higher heat insulating property by virtue of further including the heat insulating layer.

The flame retardant and heat insulating layer included in the flame retardant and heat insulating sheet (A) is a material formed from the resin composition (A), and any appropriate formation method may be adopted as a method of forming the layer to the extent that the effects of the present invention are not impaired. Such formation method is, for example, a method including: applying the resin composition (A) onto any appropriate base material (e.g., a polyethylene terephthalate film) so that its thickness after drying may be a desired thickness; heating and drying the composition; and then peeling the base material to form the flame retardant and heat insulating layer.

The flame retardant and heat insulating layer included in the flame retardant and heat insulating sheet (B) is a material formed from the resin composition (B), and any appropriate formation method may be adopted as a method of forming the layer to the extent that the effects of the present invention are not impaired. Such formation method is, for example, a method including: applying the resin composition (B) onto any appropriate base material (e.g., a polyethylene terephthalate film) so that its thickness after drying may be a desired thickness; heating and drying the composition; and then peeling the base material to form the flame retardant and heat insulating layer.

Each of the resin composition (A) and the resin composition (B) may be a solvent-based composition, an aqueous dispersion-based composition, or a solvent-free composition (e.g., a hot melt-type composition). For example, each of the compositions may be a paint composition.

A method of applying each of the resin composition (A) and the resin composition (B) is, for example, any appropriate application method, such as an applicator, kiss coating, gravure coating, bar coating, spray coating, knife coating, wire coating, dip coating, die coating, curtain coating, dispenser coating, screen printing, or metal mask printing.

The flame retardant and heat insulating layer included in the flame retardant and heat insulating sheet of the present invention is formed from the resin composition (A) or the resin composition (B). In this case, the resin composition (A) or the resin composition (B), which is a formation material for the flame retardant and heat insulating layer included in the flame retardant and heat insulating sheet of the present invention, and the composition of the flame retardant and heat insulating layer included in the flame retardant and heat insulating sheet of the present invention may not be identical to each other. For example, when the resin composition (A) is applied onto any appropriate base material so that its thickness after drying may be a desired thickness, followed by its heating and drying, at least part of the resin composition (A) causes a curing reaction in some cases. In such cases, the resin composition (A), which is a formation material for the flame retardant and heat insulating layer included in the flame retardant and heat insulating sheet (A), and the composition of the flame retardant and heat insulating sheet (A) are not identical to each other. Accordingly, there exists a situation in which it is difficult to specify the flame retardant and heat insulating layer included in the flame retardant and heat insulating sheet of the present invention on the basis of its own composition. In view of the foregoing, the specification of the flame retardant and heat insulating layer included in the flame retardant and heat insulating sheet of the present invention as a product is performed by specifying the resin composition (A) or the resin composition (B), which is a formation material for the flame retardant and heat insulating layer included in the flame retardant and heat insulating sheet of the present invention.

The thickness of the flame retardant and heat insulating sheet of the present invention is preferably from 50 μm to 100,000 μm, more preferably from 100 μm to 50,000 μm, still more preferably from 200 μm to 30,000 μm, particularly preferably from 300 μm to 10,000 μm, most preferably from 500 μm to 5,000 μm. When the thickness falls within the ranges, the flame retardant and heat insulating sheet of the present invention can express the effects of the present invention to a larger extent. When the thickness of the flame retardant and heat insulating sheet is excessively small, the flame retardant and heat insulating sheet may be unable to express sufficient flame retardancy and a sufficient heat insulating property. When the thickness of the flame retardant and heat insulating sheet is excessively large, it may be difficult to handle the sheet.

The thickness of the flame retardant and heat insulating layer included in the flame retardant and heat insulating sheet of the present invention is preferably from 20 μm to 3,000 μm, more preferably from 40 μm to 2,000 μm, still more preferably from 60 μm to 1,000 μm, particularly preferably from 80 μm to 500 μm, most preferably from 100 μm to 300 μm. When the thickness falls within the ranges, the flame retardant and heat insulating sheet of the present invention can express the effects of the present invention to a larger extent. When the thickness of the flame retardant and heat insulating layer is excessively small, the flame retardant and heat insulating sheet may be unable to express sufficient flame retardancy and a sufficient heat insulating property. When the thickness of the flame retardant and heat insulating layer is excessively large, it may be difficult to handle the sheet.

The thickness of the heat insulating layer included in the flame retardant and heat insulating sheet of the present invention is preferably from 50 μm to 100,000 μm, more preferably from 100 μm to 50,000 μm, still more preferably from 200 μm to 30,000 μm, particularly preferably from 300 μm to 10,000 μm, most preferably from 500 μm to 5,000 μm. When the thickness falls within the ranges, the flame retardant and heat insulating sheet of the present invention can express the effects of the present invention to a larger extent. When the thickness of the heat insulating layer is excessively small, the flame retardant and heat insulating sheet may be unable to express a sufficient heat insulating property. When the thickness of the heat insulating layer is excessively large, it may be difficult to handle the sheet.

When the flame retardant and heat insulating sheet of the present invention includes the pressure-sensitive adhesive layer that may be used for bonding layers to each other, the thickness of the pressure-sensitive adhesive layer is preferably from 1 μm to 200 μm, more preferably from 2 μm to 100 μm, still more preferably from 5 μm to 80 μm, particularly preferably from 8 μm to 50 μm, most preferably from 10 μm to 30 μm. When the thickness falls within the ranges, the flame retardant and heat insulating sheet of the present invention can express the effects of the present invention to a larger extent. When the thickness of the pressure-sensitive adhesive layer is excessively small, the pressure-sensitive adhesive layer may be unable to sufficiently bond layers to each other. When the thickness of the pressure-sensitive adhesive layer is excessively large, it may be difficult to handle the sheet.

When a measurement sample cut out of the flame retardant and heat insulating sheet of the present invention so as to have a sheet shape having a width of 150 mm and a length of 200 mm is placed horizontally, and a flame from a gas burner is brought into contact with the lower surface (sheet surface) of the sheet-shaped measurement sample for 10 seconds, it is preferred that the sample be free of ignition and maintain its sheet shape, and it is more preferred that the sample be free of ignition, maintain its sheet shape, and be free of deformation of the sheet shape. As just described, the flame retardant and heat insulating sheet of the present invention can express high flame retardancy.

The flame retardant and heat insulating sheet of the present invention preferably has a gross calorific value per 10 minutes of 30 $MJ/m^2$ or less, a maximum heat generation rate of 300 $kW/m^2$ or less, and an ignition time of 60 seconds or more in a cone calorimeter test in conformity with ISO 5660-1:2002. As just described, the flame retardant and heat insulating sheet of the present invention can express high flame retardancy.

The weight loss of the flame retardant and heat insulating sheet of the present invention measured by thermogravimetric analysis including scanning the sheet under an air atmosphere at a rate of temperature increase of 50° C./min from room temperature to 1,000° C. is preferably 48 wt % or less, more preferably from 1 wt % to 48 wt %, still more preferably from 5 wt % to 45 wt %, particularly preferably from 10 wt % to 40 wt %, most preferably from 15 wt % to 35 wt %. As just described, the flame retardant and heat insulating sheet of the present invention can express high flame retardancy. It is appropriate that the weight loss be determined, for example, as follows: a sample is set in a thermogravimetric analysis (TGA) measuring apparatus, and measurement is performed by scanning the sample under an air atmosphere at a rate of temperature increase of 50° C./min from room temperature to 1,000° C., followed by the determination of the magnitude of its weight loss at 1,000° C.

The flame retardant and heat insulating sheet of the present invention has a thermal conductivity of preferably 0.20 W/m·K or less, more preferably 0.14 W/m·K or less, still more preferably 0.12 W/m·K or less, particularly preferably 0.10 W/m·K or less, most preferably 0.08 W/m·K or less. When the thermal conductivity falls within the ranges, the flame retardant and heat insulating sheet of the present invention can express a high heat insulating property.

The flame retardant and heat insulating sheet of the present invention can preferably express excellent bendability. When the flame retardant and heat insulating sheet of the present invention can express excellent bendability, the sheet can be applied to members of a wide variety of shapes, for example, an uneven part.

The specific gravity of the flame retardant and heat insulating sheet of the present invention as a whole is preferably 0.98 or less, more preferably 0.90 or less, still more preferably 0.70 or less, particularly preferably 0.50 or less, most preferably 0.40 or less. The lower limit value of the specific gravity is preferably 0.03 or more, more preferably 0.07 or more, still more preferably 0.10 or more, particularly preferably 0.15 or more. When the specific gravity is excessively high, the ratio of the voids in the flame retardant and heat insulating sheet (A) as a whole may be too small to enable the expression of a sufficient heat insulating property. When the specific gravity is excessively small, the ratio of the voids in the flame retardant and heat insulating sheet (A) as a whole may be so large that the ratio of a component for expressing flame retardancy is too small to enable the expression of sufficient flame retardancy, or the volume of the sheet may become so large as to result in poor bendability.

The flame retardant and heat insulating sheet of the present invention may include a protective layer on its surface to the extent that the effects of the present invention are not impaired.

A main component for the protective layer is preferably a polymer. The protective layer is preferably, for example, at least one selected from the group consisting of a UV-curable hard coat layer, a thermosetting hard coat layer, and an organic-inorganic hybrid hard coat layer. Such protective layer may be formed only of one layer, or may be formed of two or more layers.

The UV-curable hard coat layer may be formed from a resin composition containing a UV-curable resin. The thermosetting hard coat layer may be formed from a resin composition containing a thermosetting resin. The organic-inorganic hybrid hard coat layer may be formed from a resin composition containing an organic-inorganic hybrid resin.

More specific examples of curable compounds to be used for the above-mentioned resins include a monomer, an oligomer, a polymer, and a silazane compound each having at least one kind selected from the group consisting of a silanol group, a precursor of a silanol group (for example, an alkoxysilyl group or a chlorosilyl group), an acryloyl group, a methacryloyl group, a cyclic ether group, an amino group, and an isocyanate group. Of those, a monomer, an oligomer, or a polymer having a silanol group is preferred from the viewpoint that its surface hardly carbonizes at the time of its combustion.

The resin composition capable of forming the hard coat layer may further contain any appropriate additive depending on purposes. Examples of such additive include a photopolymerization initiator, a silane coupling agent, a release agent, a curing agent, a curing accelerator, a diluent, an age inhibitor, a denaturant, a surfactant, a dye, a pigment, a discoloration inhibitor, a UV absorber, a softener, a stabilizer, a plasticizer, and an antifoaming agent. The kinds, the number, and the amounts of the additives contained in the resin composition capable of forming the hard coat layer may be set as appropriate depending on purposes.

Any appropriate thickness may be adopted as the thickness of the protective layer to the extent that the effects of the present invention are not impaired. Such thickness is preferably from 0.1 μm to 200 μm, more preferably from 0.2 μm to 100 μm, still more preferably from 0.5 μm to 50 μm.

<<1-1. Mechanism Via which Flame Retardancy and Heat Insulating Property are Expressed>>

The mechanism via which flame retardancy is expressed in the flame retardant and heat insulating sheet of the present invention is based on the following principle: when the flame retardant and heat insulating sheet is exposed to high temperature, a phase change occurs in the flame retardant and heat insulating sheet to form a flame retardant inorganic coating film, and the flame retardant inorganic coating film effectively blocks a flame, a combustion gas, or the like. An investigation on a component needed for the formation of the flame retardant inorganic coating film by the phase change has revealed the following.

When the three components, that is, the binder resin, the low-melting point inorganic substance, and the high-melting point inorganic substance are caused to coexist, and are exposed to high temperature, the binder resin thermally decomposes to disappear or to form a carbide. After that, when the low-melting point inorganic substance melts to liquefy, the low-melting point inorganic substance serves as a binder component for the high-melting point inorganic substance or the carbide to form a coating film. The formed coating film serves as a flame retardant coating film because all of the liquefied low-melting point inorganic substance and the high-melting point inorganic substance or the carbide are flame retardant substances. In this case, when a contrivance is made for allowing the formed coating film to have voids, a heat insulating property can be expressed as well as flame retardancy. Such contrivance for allowing the formed coating film to have voids involves, for example, causing the resin composition (A) to contain a binder resin, a low-melting point inorganic substance, a high-melting point inorganic substance, and voids. In this case, as the voids, for example, a void-containing material, such as a balloon material or a foamed material, having flame retardancy is incorporated into the resin composition (A). In one embodiment, for example, when a high-melting point inorganic substance having voids (e.g., a glass balloon or a silica balloon) is adopted as the high-melting point inorganic substance, the presence of the high-melting point inorganic substance can double as the presence of the voids.

When the two components, that is, the binder resin that produces a high-melting point inorganic substance when heated, and the low-melting point inorganic substance are caused to coexist, and are exposed to high temperature, part of the binder resin thermally decomposes to form the high-melting point inorganic substance as a residue. After that, when the low-melting point inorganic substance melts to liquefy, the low-melting point inorganic substance serves as a binder component for the high-melting point inorganic substance to form a coating film. The formed coating film serves as a flame retardant coating film because all of the liquefied low-melting point inorganic substance and the high-melting point inorganic substance are flame retardant substances. In this case, when a contrivance is made for allowing the formed coating film to have voids, a heat insulating property can be expressed as well as flame retardancy. Such contrivance for allowing the formed coating film to have voids involves, for example, causing the resin composition (B) to contain a binder resin, a low-melting point inorganic substance, and voids and/or a void-forming agent. In this case, an example of the void-forming agent is a foamable material that forms voids at high temperature.

<<1-2. Flame Retardant and Heat Insulating Layer Formed from Resin Composition (A)>>

The flame retardant and heat insulating sheet (A) includes a flame retardant and heat insulating layer formed from the resin composition (A) containing the binder resin, the low-melting point inorganic substance, the high-melting point inorganic substance, and the voids. That is, the resin composition (A) contains the binder resin, the low-melting point inorganic substance, the high-melting point inorganic substance, and the voids. The binder resins may be used alone or in combination thereof. The low-melting point inorganic substances may be used alone or in combination thereof. The high-melting point inorganic substances may be used alone or in combination thereof. The voids may have shapes identical to or different from each other, or may be of a mixed form thereof.

The total content of the binder resin, the low-melting point inorganic substance, and the high-melting point inorganic substance in the resin composition (A) is preferably from 80 wt % to 100 wt %, more preferably from 85 wt % to 100 wt %, still more preferably from 90 wt % to 100 wt %, particularly preferably from 95 wt % to 100 wt %, most preferably from 98 wt % to 100 wt % in terms of solid content. When the total content of the binder resin, the low-melting point inorganic substance, and the high-melting point inorganic substance in the resin composition (A) falls within the ranges in terms of solid content, the flame retardant and heat insulating sheet (A) can express the effects of the present invention to a larger extent. When the total content of the binder resin, the low-melting point inorganic substance, and the high-melting point inorganic substance in the resin composition (A) is excessively small in terms of solid content, the flame retardant and heat insulating sheet may be unable to express sufficient flame retardancy and a sufficient heat insulating property.

The content of the low-melting point inorganic substance with respect to 100 parts by weight of the binder resin in the resin composition (A) is preferably from 50 parts by weight to 500 parts by weight, preferably from 60 parts by weight to 450 parts by weight, more preferably from 70 parts by weight to 400 parts by weight, still more preferably from 80 parts by weight to 350 parts by weight, particularly preferably from 85 parts by weight to 300 parts by weight, most preferably from 90 parts by weight to 250 parts by weight in terms of solid content. When the content of the low-melting point inorganic substance with respect to 100 parts by weight of the binder resin in the resin composition (A) falls within the ranges in terms of solid content, the flame retardant and heat insulating sheet (A) can express the effects of the present invention to a larger extent. When the content of the low-melting point inorganic substance with respect to 100 parts by weight of the binder resin in the resin composition (A) deviates from the ranges in terms of solid content, the flame retardant and heat insulating sheet may be unable to express sufficient flame retardancy.

The content of the high-melting point inorganic substance with respect to 100 parts by weight of the binder resin in the resin composition (A) is preferably from 10 parts by weight to 400 parts by weight, more preferably from 30 parts by weight to 350 parts by weight, still more preferably from 50 parts by weight to 300 parts by weight, particularly preferably from 70 parts by weight to 250 parts by weight, most preferably from 90 parts by weight to 230 parts by weight in terms of solid content. When the content of the high-melting point inorganic substance with respect to 100 parts by weight of the binder resin in the resin composition (A) falls within the ranges in terms of solid content, the flame retardant and heat insulating sheet (A) can express the effects of the present invention to a larger extent. When the content of the high-melting point inorganic substance with respect to 100 parts by weight of the binder resin in the resin composition (A) deviates from the ranges in terms of solid content, the flame retardant and heat insulating sheet may be unable to express sufficient flame retardancy.

With regard to the ratio of the voids in the resin composition (A), for example, the specific gravity of the flame retardant and heat insulating layer formed from the resin composition (A) is preferably 0.98 or less, more preferably 0.90 or less, still more preferably 0.85 or less, particularly preferably 0.80 or less, most preferably 0.75 or less. The lower limit value of the specific gravity is preferably 0.20 or more, more preferably 0.25 or more, still more preferably 0.30 or more, particularly preferably 0.35 or more. When the specific gravity is excessively high, the ratio of the voids in the resin composition (A), and by extension, the ratio of the voids in the flame retardant and heat insulating layer included in the flame retardant and heat insulating sheet (A) may be too small to enable the expression of a sufficient heat insulating property. When the specific gravity is excessively small, the ratio of the voids in the resin composition (A), and by extension, the ratio of the voids in the flame retardant and heat insulating layer included in the flame retardant and heat insulating sheet (A) may be so large that the ratio of a component for expressing flame retardancy is too small to enable the expression of sufficient flame retardancy.

The resin composition (A) may contain any appropriate other component in addition to the binder resin, the low-melting point inorganic substance, the high-melting point inorganic substance, and the voids to the extent that the effects of the present invention are not impaired. Such other components may be used alone or in combination thereof. Examples of such other component include a solvent, a cross-linking agent, a pigment, a dye, a leveling agent, a plasticizer, a thickener, a drying agent, an antifoaming agent, a foaming agent, a carbonization accelerator, and a rust inhibitor.

<1-2-1. Binder Resin>

Any appropriate binder resin may be adopted as the binder resin to the extent that the effects of the present invention are not impaired. The binder resins may be used alone or in combination thereof. Such binder resin is preferably at least one kind selected from a thermoplastic resin, a thermosetting resin, and a rubber because the effects of the present invention can be expressed to a larger extent.

Any appropriate thermoplastic resin may be adopted as the thermoplastic resin to the extent that the effects of the present invention are not impaired. The thermoplastic resins may be used alone or in combination thereof. Examples of such thermoplastic resin include a general-purpose plastic, an engineering plastic, and a super engineering plastic.

Examples of the general-purpose plastic include: polyolefins, such as polyethylene and polypropylene; vinyl chloride-based resins, such as polyvinyl chloride (PVC) and a vinylidene chloride resin (PVDC); acrylic resins, such as polymethyl methacrylate; styrene-based resins, such as polystyrene, an ABS resin, an AS resin, an AAS resin, an ACS resin, an AES resin, an MS resin, an SMA resin, and an MBS resin; polyesters, such as polyethylene terephthalate, polyethylene naphthalate, and polybutylene terephthalate; alkyd resins; and unsaturated polyester resins.

Examples of the engineering plastic include: polyamides (nylons), such as nylon 6, nylon 66, nylon 610, nylon 11, and nylon 12; polyethers, such as polyacetal (POM) and polyphenylene ether (PPE); and polycarbonates.

Examples of the super engineering plastic include: fluorine-based resins, such as polyvinylidene fluoride (PVDF); sulfur-containing polymers, such as polyphenylene sulfide (PPS) and polyether sulfone (PES); polyimide (PI); polyamide-imide (PAI); polyetherimide (PEI); and polyether ether ketone (PEEK).

Any appropriate thermosetting resin may be adopted as the thermosetting resin to the extent that the effects of the present invention are not impaired. The thermosetting resins may be used alone or in combination thereof. Examples of such thermosetting resin include: silicone resins; urethane resins; vinyl ester resins; phenoxy resins; epoxy resins; amino resins, such as a urea resin, a melamine resin, and a benzoguanamine resin; phenol resins; acrylic urethane resins; and acrylic silicone resins.

Any appropriate rubber may be adopted as the rubber to the extent that the effects of the present invention are not impaired. The rubbers may be used alone or in combination thereof. Examples of such rubber include a natural rubber (NR) and a synthetic rubber.

Examples of the synthetic rubber include a styrene-isoprene block polymer (SIS), an isoprene rubber (IR), a butadiene rubber (BR), a styrene-butadiene rubber (SBR), a chloroprene rubber (CR), a nitrile rubber (NBR), a butyl rubber (IIR), polyisobutylene (PIB), an ethylene-propylene rubber (e.g., EPM or EPDM), chlorosulfonated polyethylene (CSM), an acrylic rubber (ACM), a fluorine rubber (FKM), an epichlorohydrin rubber (CO), a urethane rubber (e.g., AU or EU), and a silicone rubber (e.g., FMQ, FMVQ, MQ, PMQ, PVMQ, or VMQ).

<1-2-2. Low-Melting Point Inorganic Substance>

Any appropriate low-melting point inorganic substance may be adopted as the low-melting point inorganic substance to the extent that the effects of the present invention are not impaired. The low-melting point inorganic substances may be used alone or in combination thereof. Such low-melting point inorganic substance is preferably an inorganic substance that melts at a temperature of 1,100° C. or less. Such low-melting point inorganic substance is preferably, for example, a glass frit because the effects of the present invention can be expressed to a larger extent. The glass frit is preferably at least one kind selected from a phosphate-based glass frit, a borosilicate-based glass frit, and a bismuth-based glass frit because the effects of the present invention can be expressed to a larger extent.

The yield point of the glass frit is preferably from 300° C. to 700° C., more preferably from 300° C. to 650° C., still more preferably from 300° C. to 600° C. When the yield point of the glass frit falls within the ranges, the flame retardant and heat insulating sheet (A) can express the effects of the present invention to a larger extent.

The average particle diameter of the glass frit is preferably from 0.1 μm to 50 μm, more preferably from 0.5 μm to 45 μm, still more preferably from 1 μm to 40 μm, particularly preferably from 2 μm to 35 μm, most preferably from 3 μm to 30 μm. When the average particle diameter of the glass frit falls within the ranges, the flame retardant and heat insulating sheet (A) can express the effects of the present invention to a larger extent.

<1-2-3. High-Melting Point Inorganic Substance>

Any appropriate high-melting point inorganic substance may be adopted as the high-melting point inorganic substance to the extent that the effects of the present invention are not impaired. The high-melting point inorganic substances may be used alone or in combination thereof. Such high-melting point inorganic substance is preferably an inorganic substance that does not melt at a temperature of 1,100° C. or less. Such high-melting point inorganic substance is preferably at least one kind selected from boron nitride, alumina, zinc oxide, titanium oxide, silica, barium titanate, calcium carbonate, glass beads, aluminum hydroxide, silicone powder, a glass balloon, a silica balloon, and talc because the effects of the present invention can be expressed to a larger extent.

The average particle diameter of the high-melting point inorganic substance is preferably from 0.01 μm to 50 μm, more preferably from 0.05 μm to 40 μm, still more preferably from 0.1 μm to 35 μm, particularly preferably from 0.5 μm to 30 μm, most preferably from 1 μm to 25 μm. When the average particle diameter of the high-melting point inorganic substance falls within the ranges, the flame retardant and heat insulating sheet (A) can express the effects of the present invention to a larger extent.

When a high-melting point inorganic substance having voids is adopted as the high-melting point inorganic substance, the presence of the high-melting point inorganic substance can double as the presence of the voids. Examples of such high-melting point inorganic substance having voids include a glass balloon and a silica balloon. When the high-melting point inorganic substance having voids is adopted as the high-melting point inorganic substance, the high-melting point inorganic substances having voids may be used alone or in combination thereof.

<1-2-4. Voids>

By virtue of the resin composition (A) containing the voids, the flame retardant and heat insulating sheet (A) to be obtained can express a high heat insulating property. Any appropriate means may be adopted for the voids to the extent that the effects of the present invention are not impaired as long as the flame retardant and heat insulating sheet (A) to be obtained is caused to have voids by the means. Examples of such means include:

(1) a method involving incorporating a void-containing material, such as a balloon material or a foamed material, having flame retardancy into the resin composition (A); and (2) a method involving forming voids by at least one kind selected from chemical foaming involving a chemical reaction with a foaming agent or the like, mechanical foaming involving mechanically causing a gas, such as air, to be mixed in, solvent removal foaming involving removing a solvent, such as water, and supercritical fluid foaming involving utilizing a supercritical fluid. Such methods of causing the resin composition (A) to contain voids may be used alone or in combination thereof.

As described above, when a high-melting point inorganic substance having voids is adopted as the high-melting point inorganic substance, the presence of the high-melting point inorganic substance can double as the presence of the voids. An example of such high-melting point inorganic substance having voids is at least one kind selected from a glass balloon, a silica balloon, a Shirasu balloon, and a ceramic balloon.

<<1-3. Flame Retardant and Heat Insulating Layer Formed from Resin Composition (B)>>

The flame retardant and heat insulating sheet (B) includes the flame retardant and heat insulating layer formed from the resin composition (B) containing the binder resin that produces a high-melting point inorganic substance when heated, the low-melting point inorganic substance, and the voids and/or the void-forming agent. That is, the resin composition (B) contains the binder resin that produces a high-melting point inorganic substance when heated, the low-melting point inorganic substance, and the voids and/or the void-forming agent. The binder resins that each produce a high-melting point inorganic substance when heated may be used alone or in combination thereof. The low-melting point inorganic substances may be used alone or in combination thereof. The voids may be used alone or in combination thereof. The void-forming agents may be used alone or in combination thereof.

The total content of the binder resin that produces a high-melting point inorganic substance when heated, the low-melting point inorganic substance, and the void-forming agent in the resin composition (B) is preferably from 80 wt % to 100 wt %, more preferably from 85 wt % to 100 wt %, still more preferably from 90 wt % to 100 wt %, particularly preferably from 95 wt % to 100 wt %, most preferably from 98 wt % to 100 wt % in terms of solid content. When the total content of the binder resin that produces a high-melting point inorganic substance when heated, the low-melting point inorganic substance, and the void-forming agent in the resin composition (B) falls within the ranges in terms of solid content, the flame retardant and heat insulating sheet (B) can express the effects of the present invention to a larger extent. When the total content of the binder resin that produces a high-melting point inorganic substance when heated, the low-melting point inorganic substance, and the void-forming agent in the resin composition (B) is excessively small in terms of solid content, the flame retardant and heat insulating sheet may be unable to express sufficient flame retardancy and a sufficient heat insulating property.

The content of the low-melting point inorganic substance with respect to 100 parts by weight of the binder resin that produces a high-melting point inorganic substance when heated in the resin composition (B) is preferably from 50 parts by weight to 500 parts by weight, preferably from 60 parts by weight to 450 parts by weight, more preferably from 70 parts by weight to 400 parts by weight, still more preferably from 80 parts by weight to 350 parts by weight, particularly preferably from 85 parts by weight to 300 parts by weight, most preferably from 90 parts by weight to 250 parts by weight in terms of solid content. When the content of the low-melting point inorganic substance with respect to 100 parts by weight of the binder resin that produces a high-melting point inorganic substance when heated in the resin composition (B) falls within the ranges in terms of solid content, the flame retardant and heat insulating sheet (B) can express the effects of the present invention to a larger extent. When the content of the low-melting point inorganic substance with respect to 100 parts by weight of the binder resin that produces a high-melting point inorganic substance when heated in the resin composition (B) deviates from the ranges in terms of solid content, the flame retardant and heat insulating sheet may be unable to express sufficient flame retardancy.

With regard to the ratio of the voids in the resin composition (B), for example, the specific gravity of the flame retardant and heat insulating sheet (B) obtained from the resin composition (B) is preferably 0.98 or less, more preferably 0.90 or less, still more preferably 0.85 or less, particularly preferably 0.80 or less, most preferably 0.75 or less. The lower limit value of the specific gravity is preferably 0.20 or more, more preferably 0.25 or more, still more preferably 0.30 or more, particularly preferably 0.35 or more. When the specific gravity is excessively high, the ratio of the voids in the resin composition (B), and by extension, the ratio of the voids in the flame retardant and heat insulating sheet (B) may be too small to enable the expression of a sufficient heat insulating property. When the specific gravity is excessively small, the ratio of the voids in the resin composition (B), and by extension, the ratio of the voids in the flame retardant and heat insulating sheet (B) may be so large that the ratio of a component for expressing flame retardancy is too small to enable the expression of sufficient flame retardancy.

With regard to the ratio of the voids and/or the void-forming agent in the resin composition (B), for example, the specific gravity of the flame retardant and heat insulating layer formed from the resin composition (B) is preferably 0.90 or less, more preferably 0.85 or less, still more preferably 0.80 or less, particularly preferably 0.75 or less. The lower limit value of the specific gravity is preferably 0.20 or more, more preferably 0.25 or more, still more preferably 0.30 or more, particularly preferably 0.35 or more. When the specific gravity is excessively high, the ratio of the voids and/or the void-forming agent in the resin composition (B), and by extension, the ratio of the voids in the flame retardant and heat insulating layer included in the flame retardant and heat insulating sheet (B) may be too small to enable the expression of a sufficient heat insulating property. When the specific gravity is excessively small, the ratio of the voids and/or the void-forming agent in the resin composition (B), and by extension, the ratio of the voids in the flame retardant and heat insulating layer included in the flame retardant and heat insulating sheet (B) may be so large that the ratio of a component for expressing flame retardancy is too small to enable the expression of sufficient flame retardancy.

The resin composition (B) may contain any appropriate other component in addition to the binder resin that produces a high-melting point inorganic substance when heated, the low-melting point inorganic substance, and the voids and/or the void-forming agent to the extent that the effects of the present invention are not impaired. Such other components may be used alone or in combination thereof. Examples of such other component include a solvent, a cross-linking agent, a high-melting point inorganic substance, a pigment, a dye, a leveling agent, a plasticizer, a thickener, a drying agent, an antifoaming agent, a carbonization accelerator, and a rust inhibitor.

<1-3-1. Binder Resin that Produces High-Melting Point Inorganic Substance when Heated>

Any appropriate binder resin that produces a high-melting point inorganic substance when heated may be adopted as the binder resin that produces a high-melting point inorganic substance when heated to the extent that the effects of the present invention are not impaired. The binder resins that each produce a high-melting point inorganic substance when heated may be used alone or in combination thereof. Such binder resin that produces a high-melting point inorganic substance when heated is preferably a silicone resin because the effects of the present invention can be expressed to a larger extent.

Any appropriate silicone resin may be adopted as the silicone resin to the extent that the effects of the present invention are not impaired. Examples of such silicone resin include an addition reaction-type silicone, a condensation reaction-type silicone, a silicone resin, and a silicone rubber.

When the silicone resin is adopted as the binder resin that produces a high-melting point inorganic substance when heated, in the case where the silicone resin is exposed to high temperature, part of the silicone thermally decomposes to form silica as a residue. After that, when the low-melting point inorganic substance melts to liquefy, the low-melting point inorganic substance serves as a binder component for the silica to form a coating film. The formed coating film serves as a flame retardant coating film because all of the liquefied low-melting point inorganic substance and the silica are flame retardant substances.

<1-3-2. Low-Melting Point Inorganic Substance>

The description in the section <1-2-2. Low-melting Point Inorganic Substance> may be cited for the low-melting point inorganic substance in the resin composition (B).

<1-3-3. Voids>

The description in the section <1-2-4. Voids> may be cited for the voids in the resin composition (B).

<1-3-4. Void-Forming Agent>

Any appropriate material may be adopted as the void-forming agent to the extent that the effects of the present invention are not impaired as long as the material can form voids at high temperature. An example of such material is a foamable material. An example of the foamable material is a foaming agent that forms voids through chemical foaming, and a typical example thereof is foaming particles.

Any appropriate foaming particles may be adopted as the foaming particles to the extent that the effects of the present invention are not impaired. The foaming particles are preferably flame retardant foaming particles.

<<1-4. Heat Insulating Layer>>

Any appropriate heat insulating layer may be adopted as the heat insulating layer included in the flame retardant and heat insulating sheet of the present invention to the extent that the effects of the present invention are not impaired. Examples of such heat insulating layer include: fibrous heat insulators, such as glass wool, rock wool, and a cellulose fiber; plastic-based heat insulators, such as polystyrene foam, polyolefin foams including polyethylene foam and polypropylene foam, hard urethane foam, phenolic foam, acrylic foam, and silicone foam; and a nanoporous body, such as an aerogel.

The flame retardant and heat insulating sheet of the present invention includes the heat insulating layer together with the flame retardant and heat insulating layer, and hence the heat insulating effect of the flame retardant and heat insulating sheet of the present invention can be further improved. The heat insulating layer preferably has flame retardancy to the extent possible. However, by avoiding arranging the heat insulating layer toward a potentially combustible environment side as much as possible, that is, by arranging the flame retardant and heat insulating layer toward the potentially combustible environment side as much as possible, flame retardancy can be secured by the flame retardant and heat insulating layer, and a high heat insulating property can also be secured.

<<1-5. Pressure-Sensitive Adhesive Layer>>

The pressure-sensitive adhesive layer may be used for bonding constituent layers of the flame retardant and heat insulating sheet of the present invention to each other. Any appropriate pressure-sensitive adhesive layer may be adopted as such pressure-sensitive adhesive layer to the extent that the effects of the present invention are not impaired.

The pressure-sensitive adhesive layer is formed from a pressure-sensitive adhesive composition. The pressure-sensitive adhesive layer may be formed by any appropriate method as long as the method can form the pressure-sensitive adhesive composition into a layer. An example of the method of forming the pressure-sensitive adhesive layer is a method involving applying the pressure-sensitive adhesive composition onto any appropriate base material, performing heating or the like, active energy ray (e.g., UV) irradiation, drying, or the like as required, and curing the composition as required, to thereby form the pressure-sensitive adhesive layer on the base material. Examples of such application method include methods involving using a gravure roll coater, a reverse roll coater, a kiss roll coater, a dip roll coater, a bar coater, a knife coater, an air knife coater, a spray coater, a comma coater, a direct coater, and a roll brush coater.

The pressure-sensitive adhesive composition preferably contains a resin component. Any appropriate resin component that is generally used in a pressure-sensitive adhesive composition may be adopted as the resin component to the extent that the effects of the present invention are not impaired. Such resin component is preferably a silicone resin because the effects of the present invention can be expressed to a larger extent.

The resin components that may be contained in the pressure-sensitive adhesive composition may be used alone or in combination thereof.

Any appropriate silicone resin may be adopted as the silicone resin to the extent that the effects of the present invention are not impaired. Examples of such silicone resin include an addition reaction-type silicone, a condensation reaction-type silicone, a silicone resin, and a silicone rubber.

The pressure-sensitive adhesive composition may contain a cross-linking agent. The cross-linking agents may be used alone or in combination thereof.

The pressure-sensitive adhesive composition may contain any appropriate other component to the extent that the effects of the present invention are not impaired. Examples of such other component include a polymerization initiator, a chain transfer agent, a solvent, a resin component other than the silicone resin, a cross-linking accelerator, a cross-linking catalyst, a silane coupling agent, a tackifier resin (e.g., a rosin derivative, a polyterpene resin, a petroleum resin, or an oil-soluble phenol), an age inhibitor, an inorganic filler, an organic filler, a metal powder, a colorant (e.g., a pigment or a dye), a foil-like product, a UV absorber, an antioxidant, a light stabilizer, a plasticizer, a softening agent, a surfactant, an antistatic agent, a conductive agent, a stabilizer, a surface lubricant, a leveling agent, a corrosion inhibiter, a heat stabilizer, a polymerization inhibitor, a lubricant, and a catalyst. Any appropriate content may be adopted as the content of such other component to the extent that the effects of the present invention are not impaired.

<<<<2. Flame Retardant Heat Insulator>>>>

A flame retardant heat insulator of the present invention includes the flame retardant and heat insulating sheet of the present invention and a base material. By virtue of the inclusion of the base material in the flame retardant heat insulator of the present invention, for example, its handleability can become satisfactory.

The flame retardant heat insulator of the present invention may include any appropriate other member to the extent that the effects of the present invention are not impaired as long as the flame retardant heat insulator includes the flame retardant and heat insulating sheet of the present invention and the base material.

The base material may be finally peeled.

The number of layers of the base material may be only one, or two or more.

The thickness of the base material is preferably from 5 µm to 300 µm because the effects of the present invention can be expressed to a larger extent, and is more preferably from 10 µm to 200 µm, still more preferably from 10 µm to 150 µm, particularly preferably from 10 µm to 130 µm, most preferably from 20 µm to 120 µm.

Examples of a material for the base material include: a plastic film formed of a polyester-based resin, such as polyethylene terephthalate (PET), polyethylene naphthalate (PEN), or polybutylene terephthalate (PBT); a plastic film formed of an olefin-based resin containing an α-olefin as a monomer component, such as polyethylene (PE), polypropylene (PP), polymethylpentene (PMP), an ethylene-propylene copolymer, or an ethylene-vinyl acetate copolymer (EVA); a plastic film formed of polyvinyl chloride (PVC); a plastic film formed of a vinyl acetate-based resin; a plastic film formed of polycarbonate (PC); a plastic film formed of polyphenylene sulfide (PPS); a plastic film formed of an amide-based resin, such as polyamide (nylon) or wholly aromatic polyamide (aramid); a plastic film formed of a polyimide-based resin; a plastic film formed of polyether ether ketone (PEEK); a plastic film formed of an olefin-based resin, such as polyethylene (PE) or polypropylene (PP); and a plastic film formed of a fluorine-based resin, such as polytetrafluoroethylene, polychlorotrifluoroethylene, polyvinyl fluoride, polyvinylidene fluoride, a tetrafluoroethylene-hexafluoropropylene copolymer, or a chlorofluoroethylene-vinylidene fluoride copolymer.

The base material may be stretched.

The base material may be subjected to surface treatment. Examples of the surface treatment include corona treatment, plasma treatment, chromic acid treatment, ozone exposure, flame exposure, high-voltage electric shock exposure, ionizing radiation treatment, and coating treatment with an undercoating agent.

The base material may contain any appropriate additive to the extent that the effects of the present invention are not impaired.

The base material may have a release layer to impart peelability thereto. When the base material has the release layer, the release layer side thereof is typically laminated directly on the flame retardant and heat insulating sheet.

Any appropriate formation material may be adopted as a formation material for the release layer to the extent that the effects of the present invention are not impaired. Examples of such formation material include a silicone-based release agent, a fluorine-based release agent, a long-chain alkyl-based release agent, and a fatty acid amide-based release agent. Of those, a silicone-based release agent is preferred. The release layer may be formed as an applied layer.

Any appropriate thickness may be adopted as the thickness of the release layer depending on purposes to the extent that the effects of the present invention are not impaired. Such thickness is preferably from 10 nm to 2,000 nm, more preferably from 10 nm to 1,500 nm, still more preferably from 10 nm to 1,000 nm, particularly preferably from 10 nm to 500 nm.

The number of the release layers may be only one, or two or more.

As a silicone-based release layer, there is given, for example, an addition reaction-type silicone resin. Specific examples of the addition reaction-type silicone resin include: KS-774, KS-775, KS-778, KS-779H, KS-847H, and KS-847T manufactured by Shin-Etsu Chemical Co., Ltd.; TPR-6700, TPR-6710, and TPR-6721 manufactured by Toshiba Silicone Co., Ltd.; and SD7220 and SD7226 manufactured by Dow Corning Toray Co., Ltd. The application amount of the silicone-based release layer (after its drying) is preferably from 0.01 g/m² to 2 g/m², more preferably from 0.01 g/m² to 1 g/m², still more preferably from 0.01 g/m² to 0.5 g/m².

The release layer may be formed by, for example, applying the above-mentioned formation material onto any appropriate layer by a hitherto known application method, such as reverse gravure coating, bar coating, or die coating, and then curing the formation material through heat treatment, which is typically performed at from about 120° C. to about 200° C. In addition, as required, the heat treatment and active energy ray irradiation, such as UV irradiation, may be used in combination.

<<<<3. Applications>>>>

The flame retardant and heat insulating sheet of the present invention and the flame retardant heat insulator of the present invention can each express high flame retardancy and a high heat insulating property, and hence can each be utilized as an interior member for a transporting machine, such as a railway vehicle, an aircraft, an automobile, a ship, an elevator, or an escalator (interior member for a transporting machine), an exterior member for a transporting machine, a building material member, a display member, a household electric appliance member, or an electronic circuit member.

EXAMPLES

Now, the present invention is more specifically described by way of Examples and Comparative Examples. However, the present invention is by no means limited thereto. In the following description, "part(s)" and "%" are by weight unless otherwise specified.

<Combustion Test>

A flame retardant and heat insulating sheet or material cut into a sheet shape having a width of 150 mm and a length of 200 mm (sheet-shaped measurement sample) was placed horizontally, and a flame from a gas burner was brought into contact with the lower surface (sheet surface) of the sheet-shaped measurement sample for 10 seconds. The shape of the flame retardant and heat insulating sheet or material after the flame contact was evaluated by the following criteria.

○: The flame retardant and heat insulating sheet or material is free of ignition, maintains its sheet shape, and does not deform.

Δ: The flame retardant and heat insulating sheet or material is free of ignition and maintains its sheet shape, but deforms.

x: The flame retardant and heat insulating sheet or material cannot maintain its sheet shape.

<Thermal Conductivity>

Thermal conductivity measurement was performed with a thermal characteristic-evaluating apparatus illustrated in FIG. 1.

Specifically, a measurement sample 1 (a flame retardant and heat insulating sheet obtained in any one of Examples or a sheet obtained in any one of Comparative Examples) (20 mm×20 mm) was sandwiched between a pair of blocks (sometimes referred to as "rods") L made of aluminum (A5052, thermal conductivity: 140 W/m·K), which had each been formed so as to be a cube 20 mm on a side.

Then, the pair of blocks L was arranged between a heater (heater block) H and a radiator (cooling base plate configured to circulate cooling water therein) C so that the blocks were vertically arranged. Specifically, the heater H was arranged above the upper block L, and the radiator C was arranged below the lower block L.

At this time, the pair of blocks L is positioned between a pair of screws T for pressure adjustment penetrating the heater H and the radiator C. A load cell R is arranged between each of the screws T for pressure adjustment and the heater H, and is configured so that a pressure when the screw T for pressure adjustment is fastened may be measured. Such pressure was used as a pressure applied to the measurement sample 1.

Specifically, in this test, the screws T for pressure adjustment were fastened so that a pressure applied to the measurement sample 1 became 25 N/cm² (250 kPa).

In addition, three probes P (each having a diameter of 1 mm) of a contact-type displacement meter were arranged so as to penetrate the lower block L and the measurement sample 1 from the radiator C side. At this time, the upper end portions of the probes P are each in a state of being in contact with the lower surface of the upper block L, and are configured so as to be capable of measuring a distance between the upper and lower blocks L (the thickness of the measurement sample 1).

Temperature sensors D were attached to the heater H and the upper and lower blocks L. Specifically, the temperature sensor D was attached to one site of the heater H, and the temperature sensors D were attached to five sites of each block L in a vertical direction at intervals of 5 mm.

In the measurement, first, the screws T for pressure adjustment were fastened to apply a pressure to the measurement sample 1, and the temperature of the heater H was set to 80° C. In addition, cooling water at 20° C. was circulated in the radiator C.

Then, after the temperatures of the heater H, and the upper and lower blocks L had been stabilized, the temperatures of the upper and lower blocks L were measured with the respective temperature sensors D, and a heat flux passing through the measurement sample 1 was calculated from the thermal conductivities (W/m·K) of the upper and lower blocks L, and a temperature gradient between the blocks. In addition, the temperature of an interface between each of the upper and lower blocks L, and the measurement sample 1 was calculated. Then, the thermal conductivity (W/m·K) of the measurement sample at the pressure was calculated from the following thermal conductivity equation (Fourier's law) by using those values.

$$Q = -\lambda \mathrm{grad} T$$

Q: heat flux per unit area
gradT: temperature gradient
λ: thermal conductivity

<Bendability>

A flame retardant and heat insulating sheet or material cut into a sheet shape having a width of 10 mm and a length of 50 mm (sheet-shaped measurement sample) was wrapped twice around a metal rod having a diameter of 10 mm. The sheet after the wrapping was evaluated by the following criteria.

○: Neither cracked nor broken
Δ: Cracked or broken
x: Unable to be wrapped

<Specific Gravity>

A specific gravity was calculated for a flame retardant and heat insulating layer, flame retardant and heat insulating sheet, or material cut into a sheet shape measuring 10 mm square (sheet-shaped measurement sample) through use of an electronic specific gravity meter (MD-200S, manufactured by Alfa Mirage Co., Ltd.).

Synthesis Example 1

167 Parts by weight of a silicone-based pressure-sensitive adhesive (product name: KR-3700, solid content concentration: 60 wt %, manufactured by Shin-Etsu Chemical Co., Ltd.), 0.8 part by weight of a platinum-based catalyst (product name: CAT-PL-50T, manufactured by Shin-Etsu Chemical Co., Ltd.), 100 parts by weight of hollow glass beads (product name: Spherical 25P45, manufactured by Potters-Ballotini Co., Ltd.), 100 parts by weight of a glass frit (product name: VY0053M, manufactured by Nippon Frit Co., Ltd.), and 134 parts by weight of toluene were added to a vessel including a stirring machine, and were stirred and mixed to provide a silicone composition A.

The results are shown in Table 1.

Synthesis Example 2

167 Parts by weight of a silicone-based pressure-sensitive adhesive (product name: KR-3700, solid content concentration: 60 wt %, manufactured by Shin-Etsu Chemical Co., Ltd.), 0.8 part by weight of a platinum-based catalyst (product name: CAT-PL-50T, manufactured by Shin-Etsu Chemical Co., Ltd.), 200 parts by weight of hollow glass beads (product name: Spherical 25P45, manufactured by Potters-Ballotini Co., Ltd.), 100 parts by weight of a glass frit (product name: VY0053M, manufactured by Nippon Frit Co., Ltd.), and 201 parts by weight of toluene were added to a vessel including a stirring machine, and were stirred and mixed to provide a silicone composition B.

The results are shown in Table 1.

Synthesis Example 3

167 Parts by weight of a silicone-based pressure-sensitive adhesive (product name: KR-3700, solid content concentration: 60 wt %, manufactured by Shin-Etsu Chemical Co., Ltd.), 0.8 part by weight of a platinum-based catalyst (product name: CAT-PL-50T, manufactured by Shin-Etsu Chemical Co., Ltd.), 100 parts by weight of hollow glass beads (product name: Spherical 25P45, manufactured by Potters-Ballotini Co., Ltd.), 200 parts by weight of a glass frit (product name: VY0053M, manufactured by Nippon Frit Co., Ltd.), and 105 parts by weight of toluene were added to a vessel including a stirring machine, and were stirred and mixed to provide a silicone composition C.

The results are shown in Table 1.

Synthesis Example 4

167 Parts by weight of a silicone-based pressure-sensitive adhesive (product name: KR-3700, solid content concentration: 60 wt %, manufactured by Shin-Etsu Chemical Co., Ltd.), 0.8 part by weight of a platinum-based catalyst (product name: CAT-PL-50T, manufactured by Shin-Etsu Chemical Co., Ltd.), 200 parts by weight of hollow glass beads (product name: Spherical 25P45, manufactured by Potters-Ballotini Co., Ltd.), 200 parts by weight of a glass frit (product name: VY0053M, manufactured by Nippon Frit Co., Ltd.), and 105 parts by weight of toluene were added to a vessel including a stirring machine, and were stirred and mixed to provide a silicone composition D.

The results are shown in Table 1.

Synthesis Example 5

100 Parts by weight of an addition-type silicone resin (product name: KE-106, solid content concentration: 100 wt %, manufactured by Shin-Etsu Chemical Co., Ltd.), 10 parts by weight of a platinum-based catalyst (product name: CAT-RG, manufactured by Shin-Etsu Chemical Co., Ltd.), 100 parts by weight of hollow glass beads (product name: Spherical 25P45, manufactured by Potters-Ballotini Co., Ltd.), 200 parts by weight of a glass frit (product name: VY0053M, manufactured by Nippon Frit Co., Ltd.), and 176 parts by weight of toluene were added to a vessel including a stirring machine, and were stirred and mixed to provide a silicone composition E.

The results are shown in Table 1.

Synthesis Example 6

100 Parts by weight of a synthetic rubber (Quintac 3520, manufactured by Zeon Corporation), 100 parts by weight of hollow glass beads (product name: Spherical 25P45, manufactured by Potters-Ballotini Co., Ltd.), 200 parts by weight of a glass frit (product name: VY0053M, manufactured by Nippon Frit Co., Ltd.), and 266 parts by weight of toluene were added to a vessel including a stirring machine, and were stirred and mixed to provide a synthetic rubber composition A.

The results are shown in Table 1.

Synthesis Example 7

250 Parts by weight of an epoxy resin (product name: jER 1256B40, solid content concentration: 40%, manufactured by Mitsubishi Chemical Corporation), 10 parts of a curing agent (product name: IBMI 12, manufactured by Mitsubishi Chemical Corporation), 100 parts by weight of hollow glass beads (product name: Spherical 25P45, manufactured by Potters-Ballotini Co., Ltd.), 200 parts by weight of a glass frit (product name: VY0053M, manufactured by Nippon Frit Co., Ltd.), and 26 parts by weight of toluene were added to a vessel including a stirring machine, and were stirred and mixed to provide an epoxy composition A.

The results are shown in Table 1.

Synthesis Example 8

333 Parts by weight of an acrylic rubber (product name: SK-Dyne 1429DTB, solid content concentration: 30%, manufactured by Soken Chemical & Engineering Co., Ltd.), 100 parts by weight of hollow glass beads (product name: Spherical 25P45, manufactured by Potters-Ballotini Co., Ltd.), and 200 parts by weight of a glass frit (product name: VY0053M, manufactured by Nippon Frit Co., Ltd.) were added to a vessel including a stirring machine, and were stirred and mixed to provide an acrylic rubber composition A.

The results are shown in Table 1.

Synthesis Example 9

167 Parts by weight of a silicone-based pressure-sensitive adhesive (product name: KR-3700, solid content concentration: 60 wt %, manufactured by Shin-Etsu Chemical Co., Ltd.), 0.8 part by weight of a platinum-based catalyst (product name: CAT-PL-50T, manufactured by Shin-Etsu Chemical Co., Ltd.), 50 parts by weight of thermo-expandable particles (product name: Matsumoto Microsphere F501D, manufactured by Matsumoto Yushi-Seiyaku Co., Ltd.), 200 parts by weight of a glass frit (product name: VY0053M, manufactured by Nippon Frit Co., Ltd.), and 84 parts by weight of toluene were added to a vessel including a stirring machine, and were stirred and mixed to provide a silicone composition F.

The results are shown in Table 1.

Synthesis Example 10

100 Parts by weight of an addition-type silicone resin (product name: KE-106, solid content concentration: 100 wt %, manufactured by Shin-Etsu Chemical Co., Ltd.), 10 parts by weight of a platinum-based catalyst (product name: CAT-RG, manufactured by Shin-Etsu Chemical Co., Ltd.), 200 parts by weight of a glass frit (product name: VY0053M, manufactured by Nippon Frit Co., Ltd.), and 75 parts by weight of toluene were added to a vessel including a stirring machine, and were stirred and mixed to provide a silicone composition G.

The results are shown in Table 1.

Synthesis Example 11

167 Parts by weight of a silicone-based pressure-sensitive adhesive (product name: KR-3700, solid content concentration: 60 wt %, manufactured by Shin-Etsu Chemical Co., Ltd.), 0.8 part by weight of a platinum-based catalyst (product name: CAT-PL-50T, manufactured by Shin-Etsu Chemical Co., Ltd.), and 83 parts by weight of toluene were added to a vessel including a stirring machine, and were stirred and mixed to provide a silicone composition H.

Production Example 1

The silicone composition A obtained in Synthesis Example 1 was applied onto a polyethylene terephthalate film (thickness: 50 µm, product name: MRS, manufactured by Mitsubishi Chemical Corporation) with an applicator manufactured by Tester Sangyo Co., Ltd. so that its thickness after drying became 300 µm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer A-1 was obtained.

Production Example 2

The silicone composition B obtained in Synthesis Example 2 was applied onto a polyethylene terephthalate film (thickness: 50 µm, product name: MRS, manufactured by Mitsubishi Chemical Corporation) with an applicator manufactured by Tester Sangyo Co., Ltd. so that its thickness after drying became 300 µm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer B-1 was obtained.

Production Example 3

The silicone composition C obtained in Synthesis Example 3 was applied onto a polyethylene terephthalate film (thickness: 50 µm, product name: MRS, manufactured by Mitsubishi Chemical Corporation) with an applicator manufactured by Tester Sangyo Co., Ltd. so that its thickness after drying became 300 µm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer C-1 was obtained.

Production Example 4

The silicone composition D obtained in Synthesis Example 4 was applied onto a polyethylene terephthalate film (thickness: 50 µm, product name: MRS, manufactured by Mitsubishi Chemical Corporation) with an applicator manufactured by Tester Sangyo Co., Ltd. so that its thickness after drying became 300 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer D-1 was obtained.

Production Example 5

The silicone composition E obtained in Synthesis Example 5 was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 300 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer E-1 was obtained.

Production Example 6

The synthetic rubber composition A obtained in Synthesis Example 6 was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 300 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer F-1 was obtained.

Production Example 7

The epoxy composition A obtained in Synthesis Example 7 was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 300 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer G-1 was obtained.

The results are shown in Table 2.

Production Example 8

The acrylic rubber composition A obtained in Synthesis Example 8 was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 300 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer H-1 was obtained.

Production Example 9

The silicone composition F obtained in Synthesis Example 9 was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 900 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer I-1 was obtained.

Production Example 10

The silicone composition G obtained in Synthesis Example was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 200 μm. After that, the resultant was heated and dried in a hot air-circulating oven at 80° C. for 2 minutes and at 140° C. for 2 minutes, and the polyethylene terephthalate film was peeled. Thus, a flame retardant and heat insulating layer J-1 was obtained.

Production Example 11

The silicone composition H obtained in Synthesis Example was applied onto a polyethylene terephthalate film (thickness: 50 μm, product name: MRS, manufactured by Mitsubishi Chemical Corporation) with an applicator manufactured by Tester Sangyo Co., Ltd. so that its thickness after drying became 20 μm. After that, the resultant was heated and dried in a hot air-circulating oven at 80° C. for 2 minutes and at 140° C. for 2 minutes to provide a pressure-sensitive adhesive sheet having the silicone-based pressure-sensitive adhesive formed on the polyethylene terephthalate film.

Example 1

The surface, to which the silicone-based pressure-sensitive adhesive had been applied, of the pressure-sensitive adhesive sheet obtained in Production Example 11 was bonded to the flame retardant and heat insulating layer A-1 obtained in Production Example 1. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet A-2.

The results are shown in Table 2.

Example 2

The surface, to which the silicone-based pressure-sensitive adhesive had been applied, of the pressure-sensitive adhesive sheet obtained in Production Example 11 was bonded to the flame retardant and heat insulating layer B-1 obtained in Production Example 2. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet B-2.

The results are shown in Table 2.

Example 3

The surface, to which the silicone-based pressure-sensitive adhesive had been applied, of the pressure-sensitive adhesive sheet obtained in Production Example 11 was bonded to the flame retardant and heat insulating layer C-1 obtained in Production Example 3. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet C-2.

The results are shown in Table 2.

Example 4

The surface, to which the silicone-based pressure-sensitive adhesive had been applied, of the pressure-sensitive adhesive sheet obtained in Production Example 11 was bonded to the flame retardant and heat insulating layer D-1 obtained in Production Example 4. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet D-2.

The results are shown in Table 2.

Example 5

The surface, to which the silicone-based pressure-sensitive adhesive had been applied, of the pressure-sensitive adhesive sheet obtained in Production Example 11 was bonded to the flame retardant and heat insulating layer E-1 obtained in Production Example 5. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet E-2.

The results are shown in Table 2.

Example 6

The surface, to which the silicone-based pressure-sensitive adhesive had been applied, of the pressure-sensitive adhesive sheet obtained in Production Example 11 was bonded to the flame retardant and heat insulating layer F-1 obtained in Production Example 6. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet F-2.

The results are shown in Table 2.

Example 7

The surface, to which the silicone-based pressure-sensitive adhesive had been applied, of the pressure-sensitive adhesive sheet obtained in Production Example 11 was bonded to the flame retardant and heat insulating layer G-1 obtained in Production Example 7. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet G-2.

The results are shown in Table 2.

Example 8

The surface, to which the silicone-based pressure-sensitive adhesive had been applied, of the pressure-sensitive adhesive sheet obtained in Production Example 11 was bonded to the flame retardant and heat insulating layer H-1 obtained in Production Example 8. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet H-2.

The results are shown in Table 2.

Example 9

The surface, to which the silicone-based pressure-sensitive adhesive had been applied, of the pressure-sensitive adhesive sheet obtained in Production Example 11 was bonded to the flame retardant and heat insulating layer I-1 obtained in Production Example 9. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet 1-2.

The results are shown in Table 2.

Example 10

The surface, to which the silicone-based pressure-sensitive adhesive had been applied, of the pressure-sensitive adhesive sheet obtained in Production Example 11 was bonded to the flame retardant and heat insulating layer A-1 obtained in Production Example 1. After that, the polyethylene terephthalate film was peeled, and the exposed surface was bonded to polystyrene foam (thickness: 20 mm, product name: Styrofoam IB, manufactured by DuPont Styro Corporation) to provide a flame retardant and heat insulating sheet A-3.

The results are shown in Table 2.

Example 11

The surface, to which the silicone-based pressure-sensitive adhesive had been applied, of the pressure-sensitive adhesive sheet obtained in Production Example 11 was bonded to the flame retardant and heat insulating layer J-1 obtained in Production Example 10. After that, the polyethylene terephthalate film was peeled, and the exposed surface was bonded to a polyolefin foam (thickness: 900 μm, product name: FZ-2000, manufactured by Inoac Corporation) to provide a flame retardant and heat insulating sheet J-2.

The results are shown in Table 2.

Comparative Example 1

The flame retardant and heat insulating layer J-1 obtained in Production Example 10 was obtained as a sheet c1.

The results are shown in Table 2.

Comparative Example 2

A polyolefin foam (thickness: 900 μm, product name: FZ-2000, manufactured by Inoac Corporation) was used as a sheet c2.

The results are shown in Table 2.

Comparative Example 3

Polystyrene foam (thickness: 20 mm, product name: Styrofoam IB, manufactured by DuPont Styro Corporation) was used as a sheet c3.

The results are shown in Table 2.

TABLE 1

| | Composition | Binder resin Kind | | Solid content [%] | Amount [part(s)] | Low-melting point inorganic substance Kind | | Amount [part(s)] |
|---|---|---|---|---|---|---|---|---|
| Synthesis Example 1 | Silicone composition A | Silicone pressure-sensitive adhesive | KR-3700 | 60 | 167 | Glass frit | VY0053M2 | 100 |
| Synthesis Example 2 | Silicone composition B | Silicone pressure-sensitive adhesive | KR-3700 | 60 | 167 | Glass frit | VY0053M2 | 100 |
| Synthesis Example 3 | Silicone composition C | Silicone pressure-sensitive adhesive | KR-3700 | 60 | 167 | Glass frit | VY0053M2 | 200 |
| Synthesis Example 4 | Silicone composition D | Silicone pressure-sensitive adhesive | KR-3700 | 60 | 167 | Glass frit | VY0053M2 | 200 |
| Synthesis Example 5 | Silicone composition E | Addition-type silicone resin | KE-106 | 100 | 100 | Glass frit | VY0053M2 | 200 |
| Synthesis Example 6 | Synthetic rubber composition A | Synthetic rubber | Quintac3520 | 30 | 333 | Glass frit | VY0053M2 | 200 |
| Synthesis Example 7 | Epoxy composition A | Epoxy resin | jER1256B40 | 40 | 250 | Glass frit | VY0053M2 | 200 |
| Synthesis Example 8 | Acrylic rubber composition A | Acrylic rubber | SK-Dyne 1701DT | 30 | 333 | Glass frit | VY0053M2 | 200 |
| Synthesis Example 9 | Silicone composition F | Silicone pressure-sensitive adhesive | KR-3700 | 60 | 167 | Glass frit | VY0053M2 | 200 |
| Synthesis Example 10 | Silicone composition G | Addition-type silicone resin | KE-106 | 100 | 100 | Glass frit | VY0053M2 | 200 |

| | High-melting point inorganic substance Kind | Amount [part(s)] | Void-forming agent Kind | Amount [part(s)] | Other Kind | Amount [part(s)] | Toluene Amount [part(s)] |
|---|---|---|---|---|---|---|---|
| Synthesis Example 1 | Glass balloon | 25P45 100 | — | — | CAT-PL-50T | 0.8 | 134 |
| Synthesis Example 2 | Glass balloon | 25P45 200 | — | — | CAT-PL-50T | 0.8 | 201 |
| Synthesis Example 3 | Glass balloon | 25P45 100 | — | — | CAT-PL-50T | 0.8 | 105 |
| Synthesis Example 4 | Glass balloon | 25P45 200 | — | — | CAT-PL-50T | 0.8 | 148 |
| Synthesis Example 5 | Glass balloon | 25P45 100 | — | — | CAT-RG | 10.0 | 176 |
| Synthesis Example 6 | Glass balloon | 25P45 100 | — | — | — | — | — |
| Synthesis Example 7 | Glass balloon | 25P45 100 | — | — | IBMI12 | 10 | 26 |
| Synthesis Example 8 | Glass balloon | 25P45 100 | — | — | — | — | — |
| Synthesis Example 9 | — | — | Foaming particles | F501D 50 | CAT-PL-50T | 0.8 | 84 |
| Synthesis Example 10 | — | — | — | — | CAT-RG | 10.0 | 75 |

TABLE 2

| | Sheet | Configuration | | | | | |
|---|---|---|---|---|---|---|---|
| | | Flame retardant and heat insulating layer | Thickness [μm] | Pressure-sensitive adhesive layer | Thickness [μm] | Heat insulating layer | Thickness [μm] |
| Example 1 | Flame retardant and heat insulating sheet A-2 | Silicone composition A | 300 | Silicone composition H | 20 | PO foam | 900 |
| Example 2 | Flame retardant and heat insulating sheet B-2 | Silicone composition B | 300 | Silicone composition H | 20 | PO foam | 900 |
| Example 3 | Flame retardant and heat insulating sheet C-2 | Silicone composition C | 300 | Silicone composition H | 20 | PO foam | 900 |
| Example 4 | Flame retardant and heat insulating sheet D-2 | Silicone composition D | 300 | Silicone composition H | 20 | PO foam | 900 |
| Example 5 | Flame retardant and heat insulating sheet E-2 | Silicone composition E | 300 | Silicone composition H | 20 | PO foam | 900 |
| Example 6 | Flame retardant and heat insulating sheet F-2 | Synthetic rubber composition A | 300 | Silicone composition H | 20 | PO foam | 900 |
| Example 7 | Flame retardant and heat insulating sheet G-2 | Epoxy composition A | 300 | Silicone composition H | 20 | PO foam | 900 |
| Example 8 | Flame retardant and heat insulating sheet H-2 | Acrylic rubber composition A | 300 | Silicone composition H | 20 | PO foam | 900 |
| Example 9 | Flame retardant and heat insulating sheet I-2 | Silicone composition F | 900 | Silicone composition H | 20 | PO foam | 900 |
| Example 10 | Flame retardant and heat insulating sheet A-3 | Silicone composition A | 300 | Silicone composition H | 20 | PS foam | 20,000 |
| Example 11 | Flame retardant and heat insulating sheet J-2 | Silicone composition G | 200 | Silicone composition H | 20 | PO foam | 900 |
| Comparative Example 1 | sheet c1 | Silicone composition G | 200 | — | — | — | — |
| Comparative Example 2 | sheet c2 | PO foam | 900 | — | — | — | — |
| Comparative Example 3 | sheet c3 | PS foam | 20,000 | — | — | — | — |

| | Characteristics | | | | |
|---|---|---|---|---|---|
| | Thermal conductivity [W/(m·K)] | Flame retardancy | Bendability | Specific gravity of flame retardant and heat insulating layer | Specific gravity of flame retardant and heat insulating sheet as a whole |
| Example 1 | 0.04 | ○ | ○ | 0.54 | 0.21 |
| Example 2 | 0.04 | ○ | ○ | 0.51 | 0.19 |
| Example 3 | 0.04 | ○ | ○ | 0.72 | 0.25 |
| Example 4 | 0.04 | ○ | ○ | 0.62 | 0.21 |
| Example 5 | 0.04 | ○ | ○ | 0.64 | 0.22 |
| Example 6 | 0.04 | ○ | ○ | 0.63 | 0.21 |
| Example 7 | 0.04 | ○ | ○ | 0.62 | 0.21 |
| Example 8 | 0.04 | ○ | ○ | 0.61 | 0.21 |
| Example 9 | 0.04 | ○ | ○ | 0.43 | 0.36 |
| Example 10 | 0.04 | ○ | x | 0.54 | 0.04 |
| Example 11 | 0.05 | ○ | ○ | 1.53 | 0.35 |
| Comparative Example 1 | 0.23 | ○ | ○ | 1.53 | 1.53 |
| Comparative Example 2 | 0.03 | x | ○ | 0.06 | 0.06 |
| Comparative Example 3 | 0.03 | x | x | 0.03 | 0.03 |

INDUSTRIAL APPLICABILITY

The flame retardant and heat insulating sheet of the present invention and the flame retardant heat insulator of the present invention can each be suitably utilized as, for example, an interior member for a transporting machine, such as a railway vehicle, an aircraft, an automobile, a ship, an elevator, or an escalator (interior member for a transporting machine), an exterior member for a transporting machine, a building material member, a display member, a household electric appliance member, or an electronic circuit member.

REFERENCE SIGNS LIST 1 measurement sample

The invention claimed is:

1. A flame retardant and heat insulating sheet, comprising:
a flame retardant and heat insulating layer formed from a resin composition (A); and
a heat insulating layer,
wherein the resin composition (A) contains:
a binder resin;
a low-melting point inorganic substance;
a high-melting point inorganic substance; and
voids.

2. The flame retardant and heat insulating sheet according to claim 1, wherein the high-melting point inorganic substance has the voids.

3. The flame retardant and heat insulating sheet according to claim 2, wherein the high-melting point inorganic substance is at least one kind selected from a glass balloon, a silica balloon, a Shirasu balloon, and a ceramic balloon.

4. The flame retardant and heat insulating sheet according to claim 1, wherein the binder resin is at least one kind selected from a thermoplastic resin, a thermosetting resin, and a rubber.

5. The flame retardant and heat insulating sheet according to claim 1, wherein a content of the low-melting point inorganic substance with respect to 100 parts by weight of the binder resin is from 50 parts by weight to 500 parts by weight in terms of solid content.

6. The flame retardant and heat insulating sheet according to claim 1, wherein a content of the high-melting point inorganic substance with respect to 100 parts by weight of the binder resin is from 10 parts by weight to 400 parts by weight in terms of solid content.

7. The flame retardant and heat insulating sheet according to claim 1, wherein a total content of the binder resin, the low-melting point inorganic substance, and the high-melting point inorganic substance in the resin composition (A) is from 80 wt % to 100 wt % in terms of solid content.

8. The flame retardant and heat insulating sheet according to claim 1, wherein the heat insulating layer is at least one kind selected from a fibrous heat insulator, a plastic-based heat insulator, and a nanoporous body.

9. A flame retardant and heat insulating sheet, comprising:
a flame retardant and heat insulating layer formed from a resin composition (B); and
a heat insulating layer,
wherein the resin composition (B) contains:
a binder resin that produces a high-melting point inorganic substance when heated;
a low-melting point inorganic substance; and
voids and/or a void-forming agent.

10. The flame retardant and heat insulating sheet according to claim 9, wherein the void-forming agent is a foaming agent that forms voids through chemical foaming.

11. The flame retardant and heat insulating sheet according to claim 1, wherein the voids are voids formed by at least one kind selected from chemical foaming, mechanical foaming, solvent removal foaming, and supercritical fluid foaming.

12. The flame retardant and heat insulating sheet according to claim 9, wherein the binder resin that produces a high-melting point inorganic substance when heated is a silicone resin.

13. The flame retardant and heat insulating sheet according to claim 9, wherein a content of the low-melting point inorganic substance with respect to 100 parts by weight of the binder resin that produces a high-melting point inorganic substance when heated is from 50 parts by weight to 500 parts by weight in terms of solid content.

14. The flame retardant and heat insulating sheet according to claim 9, wherein a total content of the binder resin that produces a high-melting point inorganic substance when heated, the low-melting point inorganic substance, and the void-forming agent in the resin composition (B) is from 80 wt % to 100 wt % in terms of solid content.

15. The flame retardant and heat insulating sheet according to claim 9, wherein the heat insulating layer is at least one kind selected from a fibrous heat insulator, a plastic-based heat insulator, and a nanoporous body.

16. The flame retardant and heat insulating sheet according to claim 1, wherein the flame retardant and heat insulating sheet has a thickness of from 20 µm to 3,000 µm.

17. The flame retardant and heat insulating sheet according to claim 1, wherein the low-melting point inorganic substance is a glass frit.

18. The flame retardant and heat insulating sheet according to claim 17, wherein the glass frit is at least one kind selected from a phosphate-based glass frit, a borosilicate-based glass frit, and a bismuth-based glass frit.

19. A flame retardant heat insulator, comprising:
the flame retardant and heat insulating sheet of claim 1; and
a base material.

20. The flame retardant and heat insulating sheet according to claim 9, wherein the voids are voids formed by at least one kind selected from chemical foaming, mechanical foaming, solvent removal foaming, and supercritical fluid foaming.

21. The flame retardant and heat insulating sheet according to claim 9, wherein the flame retardant and heat insulating sheet has a thickness of from 20 µm to 3,000 µm.

22. The flame retardant and heat insulating sheet according to claim 9, wherein the low-melting point inorganic substance is a glass frit.

23. A flame retardant heat insulator, comprising:
the flame retardant and heat insulating sheet of claim 9; and
a base material.

* * * * *